Nov. 24, 1970 E. F. BEDFORD ET AL 3,543,132

INVERTER CIRCUIT USING UNIJUNCTION FREQUENCY DIVIDERS

Filed Jan. 31, 1969

INVENTORS
EDWARD F. BEDFORD
WALTER TLETSKI
BY
Fay, Sharpe & Mulholland
ATTORNEYS.

United States Patent Office 3,543,132
Patented Nov. 24, 1970

3,543,132

INVERTER CIRCUIT USING UNIJUNCTION FREQUENCY DIVIDERS

Edward F. Bedford, North Olmsted, and Walter Tletski, Cleveland, Ohio, assignors to Systems Electronics, Inc., Cleveland, Ohio, a corporation of Ohio Filed Jan. 31, 1969, Ser. No. 795,477
Int. Cl. H02m 7/00
U.S. Cl. 321—6 16 Claims

ABSTRACT OF THE DISCLOSURE

A compact, efficient, transistorized inverter circuit for converting low voltage direct current into a higher voltage frequency-regulated alternating current is disclosed in which the AC frequency accuracy is primarily limited by the accuracy of a crystal oscillator, which provides an output frequency which is an integral multiple of the desired ultimate output frequency. The output of the crysal oscillator provides the input to one or more divider stages which are selected in combination to reduce the frequency to the desired output frequency. The output of the desired frequency from the final divider stage provides the input to a power output stage. The ultimate output of the power stage may be connected to a sine wave converter to alter the wave form from a near square wave ouput to a sine wave. Divider stages using buffered unijunction transistor stages are also disclosed in which the output from the previous stage is provided to one of the bases of the unijunction transistor. The emitter of the unijunction transistor is connected to a capacitor, and to a variable resistor. Sizing of the resistor and capacitor determines the frequency division of the circuit. The output from the unijunction transistor divider stage provides the input to an associated buffering amplification stage.

BACKGROUND OF THE INVENTION

This invention relates to an efficient, compact, transistorized inverter circuit. More particularly, this invention relates to an inverter circuit which utilizes a crystal oscillator having a frequency output which is an integral multiple of the desired output frequency. Still more particularly, this invention relates to a transistorized inverter circuit which utilizes one or a plurality of novel and unobvious buffered unijunction divider stages.

In industrial electronics and other applications, inverter circuits are often utilized to convert low voltage direct current to high voltage alternating current. Prior art circuits are known which were directed to the solution of the problem of providing a compact, highly efficient, transistorized circuit to achieve this end. Since such circuits use low voltage direct current, it is an aim of such inverter circuits to utilize low power drain, since the typical source of the direct current is a low voltage battery. Furthermore, the art has attempted to provide such circuitry in as small a package as practical, while yet retaining frequency accuracy over a wide range of temperatures. By way of example, such inverter circuits may find utility in automotive, aircraft or missile systems.

In precision work, such as would be required in the missile industry, prior art solutions to the problem of converting low voltage direct current to high voltage alternating current are confronted with special problems of size, frequency accuracy over a wide temperature range, and reliability.

Thus, a typical DC inverter circuit utilizes a direct current input suitably connected to a charge storage device in association with a variable resistor or potentiometer. The output of this input circuit provides the input to a device such as a gas tube or Thyratron, or a solid state silicon controlled rectifier. When the DC input is applied, the capacitor begins to charge until the amplitude is sufficient to cause the ionization of the gas tube or the firing of the silicon controlled rectifier. When the element becomes conductive, an output pulse is provided.

Such a typical solution, however, suffers for reasons that it is difficult using a circuit of this type to achieve high, yet repeatable accuracy, its size is forbidding, and its stability over a wide range of temperatures is questionable.

Static inverter circuits using a crystal oscillator in combination with frequency dividers are known to the art. An example of such a circuit is shown in the United States patent to W. G. Runyan, No. 3,187,269 for a "Static Inverter System." Such arrangements have often included complex circuitry to achieve the desired goal of stability over a wide range.

The unijunction transistor, or double-base diode as it sometimes is referred to in the art, has shown desirable characteristics for use in oscillator circuits. However, attempts to incorporate unijunction transistors into inverter circuits have not been entirely successful for a number of reasons. For example, the accuracy and stability of such circuits have been unduly limited often being limited to a frequency division by 4 or 5.

Such apparent deficiencies in incorporating a unijunction transistor into an inverter circuit have been overcome by a novel and unobvious circuit arrangement hereinafter described in greater detail.

It is therefore an object of the invention to provide a transistorized inverter circuit which is compact, highly efficient, and extremely accurate over a wide temperature range.

It is a further object of this invention to provide a crystal-controlled oscillator for a stabilized, transistorized inverter circuit for providing higher AC voltage from a low voltage DC source of electrical power.

It is a further object of this invention to provide a transistorized electronic circuit for converting low voltage direct current to high voltage alternating current which is precisely regulated as to frequency and accuracy.

It is a still further object of this invention to utilize a unijunction transistor in an inverter circuit.

It is a still further object of this invention to provide a frequency conversion means utilizing a unijunction transistor having one of its bases connected to the output of a crystal oscillator.

It is a still further object of this invention to provide the circuit combination of a unijunction transistor and a transistorized buffer stage which is frequency stable over a wide temperature range.

BRIEF DESCRIPTION OF THE INVENTION

In accordance with the above objects, the circuit according to the invention includes high-frequency crystal oscillator means for producing an output frequency which is an integral multiple of the desired ultimate output of the circuit arrangement. The oscillator may be temperature-compensated or otherwise stabilized, as may be desired. The output from the crystal oscillator means is provided to a frequency conversion means which includes one or more divider stages where the input frequency is successively reduced to the ultimate desired output frequency.

In accordance with the invention, a novel and unobvious divider stage, including unijunction transistors, is provided in which the ouput of the oscillator stage is provided as an input to a base of a unijunction transistor. The emitter is connected to the common junction of a potentiometer and a capacitor. The output from the unijunction transistor stage is taken from its other base and provides the input for a succeeding amplifier buffer stage. The output from the buffering amplifier stage may provide the input for succeeding divider stages having a unijunction transistor and buffering transistor amplifier combination.

The output from the final buffering stage may provide the input for a bi-stable multivibrator circuit when a final frequency division by two is desired. The output from the multivibrator circuit provides the input to the power output stages.

In a particular embodiment disclosed, a six volt direct current input provided 115 to 150 volts alternating current, square wave output. The crystal oscillator used a 9600 hertz crystal base which is successively divided by 10 and by 8, and by 2 with a conventional bi-stable multivibrator circuit to provide a 60 hertz output. The frequency accuracy of the temperature-compensated crystal was plus or minus 20 parts per million from 0° to 60° C., while the circuit had an overall efficiency greater than 70 percent. The output from the overall arrangement, which included cascaded divider stages, provided the input for one or more output power stages. If desired, the output may be provided to a sine wave converter to convert the square wave output to a sine wave output.

With the objects of the invention in mind and with an understanding of its brief description, the invention is better understood by reference to the following detailed specification and claims and the illustrations in accompanying drawings.

PREFERRED EMBODIMENT

Figure 1:
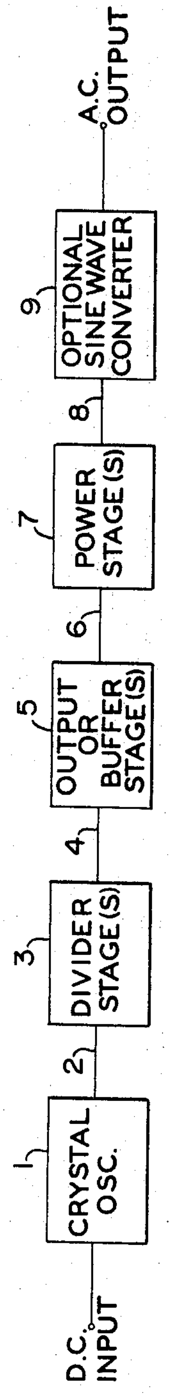
FIG. 1 is a block diagram of the circuit arrangement according to the invention.

In FIG. 1, the input circuit means include crystal oscillator means 1 operatively connected to a direct current input and having an output connected to one or more of a plurality of divider stages 3 by way of electrical connection 2. The output of each unijunction divider stage 3 is connected via suitable electrical connections 4 to provide the input for its associated output or buffer stage 5. The output of the buffer stage 5 may be connected, as shown at 6 to the power output stages 7. If desired, the output of power stage 7 may be connected via electrical lines 8 to an optional sine wave converter 9. While the output of the power stage 7 is a square wave, if a sine wave is desired, it will be readily understood that it may be obtained by the connection of a suitable sine wave converter 9 to provide an alternating current sine wave output.

Figure 2:
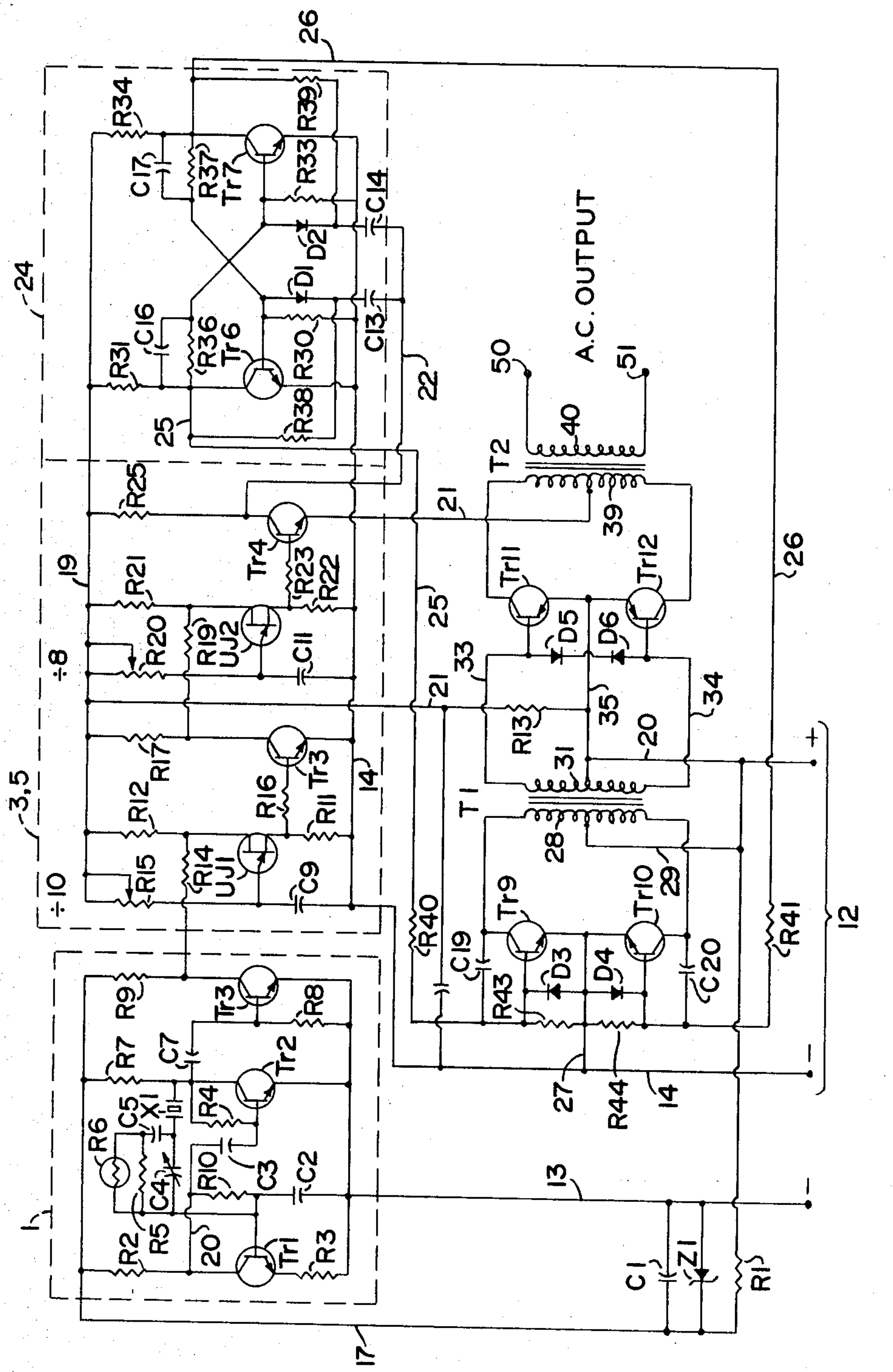
FIG. 2 is a detailed circuit diagram of the circuit arrangement according to the invention.

In FIG. 2, crystal oscillator means, shown in phantom outline at 1, are depicted as a two-stage, transistorized, temperature-stabilized crystal relaxation type oscillator.

For greater stability and isolation from the remainder of the circuit, a separate negative bias from the DC power source, shown generally at 12, is provided via lead 13 to the emitters of the transistor stages of the crystal oscillator 1. The DC power source, in the usual circumstances, will be a battery, although other sources of DC power may be used with equal facility. Positive bias is provided from the low voltage direct current source 12 via a bias resistor R1 and positive bias bus 17. The low voltage direct current supply may be stabilized by the use of Zener diode Z1 and by a suitable filter arrangement, such as shown by capacitor C1.

Crystal oscillator 1 is shown as comprising a two-stage transistor oscillator having transistors *Tr*1 and *Tr*2, illustrated, for example, as NPN transistors, in a suitable relaxation oscillator type arrangement. The first transistor stage *Tr*1 is suitably biased as by resistors R2, connected to the positive bias lead 17, and R3, connected to the negative bias lead 13.

The base of transistor *Tr*1 is suitably connected to filter capacitor C2 which in turn is connected to the negative bias lead 13. The base of transistor *Tr*1 is also biased by resistor R10 together with resistor R2. The output from the collector of the first stage *Tr*1 is provided via line 20 to provide the input to the base of transistor *Tr*2 via capacitor C3.

In the particular arrangement shown, the output from transistor *Tr*2, which provides the positive feed back oscillation, is shown connected from the collector of transistor *Tr*2, via crystal X1 in series circuit with a parallel arrangement of a variable trimmer capacitor C4 and the series-parallel arrangement of a capacitor C5 in series with resistor R5 and temperature-compensating resistor R6. Transistor *Tr*2 is, in a manner similar to transistor *Tr*1, suitably biased as by resistors R4 and R7 connected to the collector of *Tr*2 and direct connection of the emitter to negative bias 13.

The output from the second stage *Tr*2 of the crystal oscillator 1 has a frequency of 9.6 kHz., in accordance with the natural frequency of oscillation of crystal X1. The waveform at the collector of *Tr*2 is in the nature of a limited sinusoidal waveform which somewhat resembles a square wave output. The output from crystal oscillator 1 is provided via capacitor C7 to provide the input to transistor *Tr*3 operating in an amplication mode. Capacitor C7 serves to integrate the waveform and to provide some degree of pulse shaping to the waveform.

The base of transistor *Tr*3 is suitably connected to the negative bias 13 by way of resistor R8 while its collector is suitably connected to the positive bus 17 through resistor R9. Transistor stage *Tr*3 also acts as a buffering and isolation stage for the signal produced by the oscillator stage.

It has been found extremely desirable in the inverter circuit of the invention to provide an extremely accurate frequency accuracy by using a temperature-compensated crystal having an accuracy of plus or minus 20 parts per million over a temperature range of from 0° to 60° C. as herebefore noted. For purposes of illustration, the invention will be described in terms of a crystal base having an output of 9600 hertz. That frequency is low enough to provide an instant start for the circuit and is yet high enough to avoid synchronization difficulties when used, for example, in photosynchronized work.

The high frequency output from the crystal oscillator 1 provides the input to the first of a plurality of cascaded buffered divider stages, shown generally at 3 and 5. While the number and divisional capabilities of the divider stages will depend upon the particular use of the arrangement, for the circuit shown, it has been found desirable to use cascaded dividers for successfully dividing the 9600 hertz input frequency by 10, by 8, and then by 2 to provide a 60 cycle output. It is within the contemplation of this invention, however, that any desired output frequency may be obtained, limited only by the requirement that the output of the crystal oscillator be a multiple integral of the desired ultimate output frequency.

Each of the divider stages 3, as shown in FIG. 2, may be of similar construction, and include a unijunction transistor, such as UJ1, or double-base diode, as it is sometimes called, suitably biased between negative bus 14 via bias resistor R11 and positive bus 19 by way of bias resistor R12. The positive voltage of the source of direct current power 12 may be provided by way of line 20, suitable voltage dropping resistor R13 and line 21 to place the desired voltage on positive voltage bus 19.

The output of crystal oscillator 1 is provided through resistor R14 to one of the bases of the unijunction transistor UJ1. The emitter of the unijunction transistor is connected to the common connection between a variable resistor R15 and suitably-sized capacitor C9. The size of the capacitor C9 is related to the output frequency of the unijunction stage UJ1.

The output from the stage is taken from the other base of the unijunction transistor through resistor R16 to the base of a suitably biased buffer amplifier stage Tr3. In the embodiment shown, the emitter of Tr3 is directly connected to the negative bias lead 14 while its collector is suitably biased through resistor R17 to line 19.

By suitably sizing the parameters, such as R14 and C9 to be 250K ohms and .01 microfarad respectively, frequency division by 10 is possible. Thus, at the collector output of transistor Tr3, there appears a 960 hertz output which is provided via coupling resistor R19 to a base of another unijunction divider stage comprising unijunction transistor UJ2 and its associated buffer transistor output stage Tr4.

In a manner similar to the previous divider stage, the emitter of unijunction transistor UJ2 is connected to the common connection between capacitor C11 and potentiometer R20. The bases of unijunction transistor UJ2 are suitably biased by resistors R21 and R22, respectively. The output of the other base of the unijunction transistor stage UJ2 is connected by way of coupling resistor R23 to the base of buffer stage Tr4.

In one workable embodiment, 2N2646 unijunction transistors were used and were found particularly appropriate when buffered with 2N706 NPN transistors.

The collector of buffer stage Tr4 is suitably biased to bias lead 19 by resistor R25. The emitter of buffer transistor Tr4 is connected to the center tap of the output transformer T2 for grounding and stabilization purposes by way of lead 21.

It should be understood that additional or fewer buffered unijunction stages may be used in accordance with the needs of the user. For example, additional stages may be necessary where a higher crystal frequency is used. It has been found necessary, however, that each unijunction stage be buffered with an associated transistor stage.

The output from buffer stage Tr4 is taken by lead 22 to provide the input for a binary divider circuit shown generally at 24. The output from the buffer stage Tr4 comprises the input to the binary stage 24 at the midpoint of coupling capacitors C13 and C14. C13 and C14 are respectively in series with steering diodes D1 and D2. The cathode of diode D1 is suitably connected to the base of the first stage of the binary divider Tr6, while the cathode of diode D2 is suitably connected to the base of the second stage Tr7 of the binary divider.

The base of transistor Tr6 is suitably biased as at R30 to common lead 14 and its emitter is directly connected to bias lead 14. The collector of transistor Tr6 is suitably biased as by resistor R31 to positive bias lead 19.

Similarly, the base of transistor Tr7 is suitably biased as by R33 to lead 14, while the collector of Tr7 transistor is suitably biased as by R34 to bias lead 19. The emitter of transistor Tr7 is directly connected to lead 14.

The bi-stable circuit 24 is made to respond to negative trigger pulses by virtue of the connection of the anodes of diodes D1 and D2 to the bases of transistors Tr6 and Tr7 respectively.

As is understood in the art, circuit 24 is in a stable state when either transistor Tr6 or transistor Tr7 is conducting, and the other transistor is cut off. The states of the transistors are switched by application of a properly applied trigger pulse. The steering diodes D1 and D2 assure that the NPN transistors in the circuit are triggered to alternate states only when negative pulses are applied to the input terminal.

A negative trigger pulse applied to the input of circuit 24 when transistor Tr6 conducting and transistor Tr7 is cut off, causes Tr6 to conduct less. The collector voltage of this transistor increases to a more negative value. The increase in negative voltage at the collector Tr6 is coupled via a parallel combination of resistor R36 and capacitor C16 to the base of transistor Tr7.

When the coupled voltage is large enough to overcome the cutoff bias on transistor Tr7, as determined by the amplitude of the trigger pulse, transistor Tr7 conducts. The collector voltage of transistor Tr7 then decreases to a less negative value. This positive output voltage is coupled to the base of transistors Tr6 to decrease further the conduction of this transistor. This regenerative action continues until transistor Tr7 is driven to saturation and transistor Tr6 is cut off. This condition is then maintained until another negative pulse is applied to switch the multivibrator from a stable state. It may be understood that the collector output of transisor Tr7 is coupled in a regenerative fashion via resistor R37 in parallel with capacitor C17 to the base of transistor Tr6.

For speed of switching, transistor Tr6 includes a feedback resistor R38 connected between its collector and the cathode of D1 while transistor Tr7 includes a resistor R39 connected between its collector and the cathode of diode D2.

The output of multivibrator circuit 24, which is one-half of the frequency of its input, is taken from the collector of transistors Tr6 and Tr7 respectively. Output lead 25 is connected to collector Tr7.

The output at the collector of Tr6 is directed via lead 25 and voltage-dropping resistor R40 to the base of transistor Tr9 while the output from collector Tr7 is taken via lead 26 and voltage-dropping resistor R41 to the base of transistor Tr10. Transistors Tr9 and Tr10 are connected in a push-pull configuration wherein the respective emitters are tied to a common lead 27. The base of transistor Tr9 is suitably biased by resistor R43 to common while the base of Tr10 is suitably biased by resistor R44 to common.

The bases of transistors Tr9 and Tr10 are also suitably connected with clamping diodes D3 and D4 to common lead 27. In addition, for stability purposes, the collectors of stages Tr9 and Tr10 are connected to their respective bases via capacitors C19 and C20. The outputs taken from the collectors of transistors Tr9 and Tr10 are 180 degrees out of phase with each other and are respectively connected to the input winding 28 of power transformer T1. Input winding 28 is center-tapped at lead 29 which is respectively connected to the positive terminal of power supply 12.

The secondary 31 of the power transformer T1 is likewise center-tapped and connected via lead 20 as hereinbefore described to the positive terminal of the direct current supply 12. The opposite sides of winding 31 are respectively connected via leads 33 and 34 to the bases of push-pull transistor stages Tr11 and Tr12. Those stages have their emitters commonly connected as at lead 35 which in turn is connected to the center tap to provide a stable circuit.

The bases of stages Tr11 and Tr12 are respectively connected through clamping diodes D5 and D6 to lead 35. The collector outputs of stages Tr11 and Tr12 are then suitably connected to the primary winding 39 of transformer T2. The output of transformer T2 is taken across the secondary winding 40 of transistor T2.

Thus, an alternating current output at leads 50 and 51 may be obtained from the inverter circuit described. If desired, a sine wave converter may be connected to those leads to change the essentially square wave AC output to a sinusoidal AC output.

We claim:

1. An electrical circuit comprising:
(a) input circuit means, including an output circuit, for providing an input signal of a first frequency,
(b) frequency conversion means for converting said input signal to an output signal having a second frequency, said frequency conversion means including:
(b–1) a unijunction transistor stage comprising a unijunction transistor including two bases, an output circuit connected to one base, and an input circuit, including the other base, operatively connected to the output circuit of said input circuit means,
(b–2) biasing means for biasing said unijunction transistor for frequency conversion circuit operation, (b-3) a transistorized buffer amplifier stage having an input circuit operatively connected to the output circuit of said unijunction transistor, and an output circuit for providing said output signal having said second frequency.

2. The circuit as defined in claim 1 wherein said input circuit means includes a crystal oscillator means wherein the natural frequency of oscillation of the crystal determines the frequency of said input signal.

3. The circuit as defined in claim 2 wherein said crystal oscillator means includes temperature-compensation means for compensating for the change in frequncy of said crystal with temperature in such a manner that the frequency output of said crystal oscillator means is nearly linear over a wide range of temperature, said temperature-compensation means comprising a thermistor in circuit with said crystal.

4. The circuit as defined in claim 1 wherein said biasing means includes a capacitor connected to the emitter of said unijunction transistor, whereby the rate of change and discharge of said capacitor partially controls the frequency of oscillation of said unijunction transistor.

5. The circuit as defined in claim 4 further including a resistor connected to said capacitor and in circuit with a source of biasing potential, the resistance of said resistor partially determining the frequency of oscillation of said unijunction transistor by partially controlling the rate of charge and discharge of said capacitor.

6. The circuit as defined in claim 1 in which said transistorized buffer amplifier stage includes a transistor having a base, an emitter and a collector, said base of said transistor being operatively connected to said output circuit of said unijunction transistor, said transistorized buffer amplifier further including the output circuit of said transistor which includes said collector of said transistor.

7. The circuit as defined in claim 1 in which said electrical circuit includes a plurality of the said frequency conversion means wherein the other base of any suceeding unijunction transistor is connected to the output circuit of the preceeding transistorized buffer amplifier.

8. The circuit as defined in claim 1 in which said frequency conversion means further includes:

(a) a second unijunction transistor stage comprising a second unijunction transistor including two bases, an output circuit connected to one base of said second unijunction transistor, and an input circuit including the other base operatively connected to the output circuit of said transistorized buffer amplifier, (b) biasing means for biasing said second unijunction transistor for frequency conversion circuit operation, (c) a second transistorized buffer amplifier stage having an input circuit operatively connected to the output circuit of said second unijunction transistor, and an output circuit for providing said output signal having a third frequency different from said second frequency.

9. The circuit as defined in claim 1 further including bi-stable multivibrator circuit means comprising an input circuit connected to the output circuit of said transistorized buffer amplifier and an output circuit for providing a frequency which is one-half the frequency of the input signal.

10. The circuit as defined in claim 8 further including bi-stable multivibrator circuit means having an input connected to the output of said second transistorized buffer amplifier and having an output circuit for providing a frequency which is one-half the frequency of said second frequency.

11. The circuit as defined in claim 1 further including an output power stage operatively connected in circuit to the output of said frequency conversion means.

12. The circuit as defined in claim 8 further including a power output stage operatively connected in circuit with the output of said second transistorized buffer amplifier.

13. The circuit as defined in claim 10 further including a power output stage operatively connected in circuit to the output of said bi-stable multivibrator.

14. An electrical circuit for converting a low voltage direct current signal to a higher voltage alternating current signal comprising the combination of:

(a) a source of direct current power, (b) crystal oscillator means, operatively connected to said source of direct current power for providing an output signal having a frequency which is determined by the natural frequency of oscillation of the crystal, (c) frequency conversion means, operatively connected to said source of direct current power, for dividing the frequency of the output signal from said crystal oscillator means into a frequency which is an integral multiple of the frequency of said output signal from said crystal oscillator means, said frequency conversion means further including a unijunction transistor, (d) buffering means operatively connected to the output of said frequency conversion means, for buffering the output of said frequency conversion means, (e) output means, operatively connected to the output of said buffering means for providing a power output from said electrical circuit.

15. The circuit as defined in claim 14 wherein said unijunction transistor comprises an emitter and a pair of bases, one of said bases being operatively connected to the output of said crystal oscillator means, the other of said bases providing the input to said buffering means.

16. The circuit as defined in claim 15 further including a capacitor having one lead connected to the emitter of said unijunction transistor, a resistor having one end connected to the junction of said capacitor and said emitter, and wherein said buffering stage includes a transistor comprising a base operatively connected to said other base of said unijunction transistor, an emitter, and a collector for providing the output from said frequency conversion means and buffering stage combination.

References Cited

UNITED STATES PATENTS

| | | | |
|---|---|---|---|
| 2,899,572 | 8/1959 | Skelton et al. | 321—6 XR |
| 3,187,269 | 6/1965 | Runyan | 331—74 |
| 3,370,215 | 2/1968 | Light | 321—4 |
| 3,486,071 | 12/1969 | Hedge | 321—4 XR |

WILLIAM M. SHOOP, JR., Primary Examiner

U.S. Cl. X.R.

321—60, 65, 69; 331—74